(12) United States Patent
Klingbeil

(10) Patent No.: US 9,145,837 B2
(45) Date of Patent: Sep. 29, 2015

(54) ENGINE UTILIZING A PLURALITY OF FUELS, AND A RELATED METHOD THEREOF

(75) Inventor: Adam Edgar Klingbeil, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 836 days.

(21) Appl. No.: 13/306,542

(22) Filed: Nov. 29, 2011

(65) Prior Publication Data

US 2013/0133616 A1 May 30, 2013

(51) Int. Cl.

| | |
|---|---|
| *F02B 47/08* | (2006.01) |
| *F02M 25/07* | (2006.01) |
| *F02D 19/08* | (2006.01) |
| *F02D 41/00* | (2006.01) |
| *F02B 1/12* | (2006.01) |
| *F02B 3/06* | (2006.01) |
| *F02D 19/06* | (2006.01) |

(52) U.S. Cl.
CPC .......... *F02D 19/081* (2013.01); *F02D 41/0025* (2013.01); *F02D 41/0027* (2013.01); *F02D 41/0057* (2013.01); *F02M 25/0749* (2013.01); *F02B 1/12* (2013.01); *F02B 3/06* (2013.01); *F02D 19/0642* (2013.01); *F02D 41/0007* (2013.01); *Y02T 10/36* (2013.01); *Y02T 10/47* (2013.01)

(58) Field of Classification Search
CPC .......... F02M 25/0707; F02M 25/0709; F02M 25/0747; F02M 25/0748; F02M 25/0749; F02D 19/081; F02D 19/0642; F02D 41/0057; F02D 41/0027; F02D 41/0025; F02D 41/0007; Y02T 10/36; Y02T 10/47; F02B 1/12; F02B 3/06

USPC ......... 123/568.11, 568.12, 304, 58.8; 60/617, 60/605.2
See application file for complete search history.

(56) References Cited

U.S. PATENT DOCUMENTS

| | | | | | |
|---|---|---|---|---|---|
| 3,982,395 | A | * | 9/1976 | Hasegawa et al. ............... | 60/278 |
| 4,056,933 | A | * | 11/1977 | Nohira et al. .................... | 60/278 |
| 4,100,734 | A | * | 7/1978 | Ozaki et al. ..................... | 60/278 |

(Continued)

FOREIGN PATENT DOCUMENTS

| | | |
|---|---|---|
| EP | 1035315 A2 | 9/2009 |
| FR | 2957383 A1 | 9/2011 |

(Continued)

OTHER PUBLICATIONS

Search Report and Written Opinion from corresponding PCT Application No. PCT/US2012/062948 dated Feb. 15, 2013.

*Primary Examiner* — Hieu T Vo
*Assistant Examiner* — Sherman Manley
(74) *Attorney, Agent, or Firm* — Joseph J. Christian

(57) ABSTRACT

At least one donor cylinder is coupled to an intake manifold. The intake manifold is configured to feed a mixture of air and a first fuel, or a mixture of air, the first fuel, and a second fuel to the at least one donor cylinder. At least one non-donor cylinder is coupled to the intake manifold and an exhaust manifold. The intake manifold is further configured to feed air, or a mixture of air and the second fuel to the at least one non-donor cylinder. An exhaust channel extend from the at least one donor cylinder to the intake manifold for recirculating an exhaust emission from the at least one donor cylinder to the at least one donor, and non-donor cylinders via the intake manifold.

10 Claims, 3 Drawing Sheets

(56) References Cited

U.S. PATENT DOCUMENTS

| | | | |
|---|---|---|---|
| 4,108,114 A * | 8/1978 | Kosaka et al. | 123/3 |
| 4,109,462 A * | 8/1978 | Kohama et al. | 60/278 |
| 4,131,095 A * | 12/1978 | Ouchi | 123/58.8 |
| 4,249,382 A * | 2/1981 | Evans et al. | 60/605.2 |
| 4,345,572 A * | 8/1982 | Suzuki et al. | 123/568.11 |
| 5,178,119 A * | 1/1993 | Gale | 123/568.12 |
| 5,517,976 A | 5/1996 | Bachle et al. | |
| 5,711,154 A * | 1/1998 | Baechle et al. | 60/605.2 |
| 5,802,846 A | 9/1998 | Bailey | 60/278 |
| 6,050,248 A * | 4/2000 | Arulraja et al. | 123/568.11 |
| 6,053,154 A * | 4/2000 | Pott | 123/568.11 |
| 6,138,650 A * | 10/2000 | Bailey | 123/568.12 |
| 6,220,233 B1* | 4/2001 | Pierpont | 123/568.12 |
| 6,230,683 B1 | 5/2001 | Zur Loye et al. | |
| 6,286,489 B1* | 9/2001 | Bailey | 123/568.11 |
| 6,328,003 B1* | 12/2001 | Gaertner et al. | 123/58.8 |
| 6,360,732 B1* | 3/2002 | Bailey et al. | 123/568.12 |
| 6,367,256 B1* | 4/2002 | McKee | 60/605.2 |
| 6,422,215 B1* | 7/2002 | McKay et al. | 123/568.11 |
| 6,422,219 B1* | 7/2002 | Savonen et al. | 123/568.12 |
| 6,425,381 B1* | 7/2002 | Rammer | 123/568.12 |
| 6,474,060 B2* | 11/2002 | Khair | 60/275 |
| 6,484,703 B1* | 11/2002 | Bailey | 123/568.15 |
| 6,523,529 B1 | 2/2003 | Moncelle | |
| 6,543,230 B1* | 4/2003 | Schmid | 60/605.2 |
| 6,786,209 B2* | 9/2004 | Stewart | 123/568.11 |
| 6,786,210 B2* | 9/2004 | Kennedy et al. | 123/568.12 |
| 6,789,531 B1* | 9/2004 | Remmels | 123/568.11 |
| 6,915,776 B2* | 7/2005 | zur Loye et al. | 123/304 |
| 6,918,251 B2* | 7/2005 | Yanagisawa et al. | 60/605.2 |
| 6,953,030 B2* | 10/2005 | Linderyd et al. | 123/568.12 |
| 6,964,158 B2* | 11/2005 | Abdul-Khalek | 60/278 |
| 7,011,080 B2* | 3/2006 | Kennedy | 123/568.12 |
| 7,059,308 B2* | 6/2006 | Eitel et al. | 123/568.12 |
| 7,150,273 B2* | 12/2006 | Pacitti et al. | 123/568.2 |
| 7,249,596 B2 | 7/2007 | Pellizzari et al. | |
| 7,311,090 B2* | 12/2007 | Lyons | 123/568.11 |
| 7,444,815 B2* | 11/2008 | Baumgard et al. | 60/605.2 |
| 7,490,466 B2* | 2/2009 | Robel et al. | 60/301 |
| 7,721,541 B2* | 5/2010 | Roberts et al. | 60/605.2 |
| 7,779,823 B2* | 8/2010 | Winstead | 123/568.14 |
| 7,801,664 B2* | 9/2010 | Winstead | 701/103 |
| 7,886,530 B2* | 2/2011 | Winsor et al. | 60/295 |
| 7,941,999 B2* | 5/2011 | Kasper et al. | 60/605.2 |
| 8,020,525 B2* | 9/2011 | Winstead | 123/58.8 |
| 8,069,657 B2* | 12/2011 | Gray, Jr. | 60/295 |
| 8,096,124 B2* | 1/2012 | Pierpont et al. | 60/605.2 |
| 8,176,894 B2* | 5/2012 | Ulrey et al. | 123/336 |
| 8,250,865 B2* | 8/2012 | Pearson | 60/605.2 |
| 8,291,891 B2* | 10/2012 | Alger et al. | 123/568.11 |
| 8,316,829 B2* | 11/2012 | Piper et al. | 123/568.21 |
| 8,539,768 B2* | 9/2013 | Hayman et al. | 60/605.2 |
| 8,561,599 B2* | 10/2013 | Gingrich et al. | 123/568.17 |
| 8,640,457 B2* | 2/2014 | Gokhale et al. | 60/605.2 |
| 8,733,081 B2* | 5/2014 | Miyashita | 60/278 |
| 8,752,532 B2* | 6/2014 | Korenaga et al. | 123/568.11 |
| 8,904,786 B2* | 12/2014 | Hayman | 60/605.2 |
| 8,915,081 B2* | 12/2014 | Hayman et al. | 60/605.2 |
| 2007/0005655 A1 | 1/2007 | Takehara et al. | |
| 2007/0056554 A1 | 3/2007 | Li et al. | |
| 2008/0156569 A1 | 7/2008 | Clevenger et al. | |
| 2008/0264036 A1 | 10/2008 | Bellovary | |
| 2009/0120385 A1 | 5/2009 | Munshi et al. | |
| 2011/0041495 A1 | 2/2011 | Yager | |

FOREIGN PATENT DOCUMENTS

| | | |
|---|---|---|
| WO | 01/75294 A1 | 10/2001 |
| WO | 2010116064 A1 | 10/2010 |

* cited by examiner

ENGINE UTILIZING A PLURALITY OF FUELS, AND A RELATED METHOD THEREOF

BACKGROUND

The invention relates generally to engines, and more specifically to engines using more than one fuel.

Compression-ignition engines, such as diesel engines, operate by directly injecting a fuel (e.g., diesel fuel) into compressed air in one or more piston-cylinder assemblies, such that the heat of the compressed air ignites the fuel-air mixture. Compression-ignition engines also can include a glow plug or grid heater to provide heat to ensure ignition, particularly during cold start conditions. The direct fuel injection atomizes the fuel into droplets, which evaporate and mix with the compressed air in the combustion chambers of the piston-cylinder assemblies. Typically, compression-ignition engines operate at a relatively higher compression ratio than spark ignition engines. The compression ratio directly affects the engine performance, efficiency, exhaust pollutants, and other engine characteristics. In addition, the fuel-air ratio affects engine performance, efficiency, exhaust pollutants, and other engine characteristics. Exhaust emissions generally include pollutants such as carbon oxides (e.g., carbon monoxide), nitrogen oxides (NOx), sulfur oxides (SOx), and particulate matter (PM). The amount and relative proportion of these pollutants varies according to the fuel-air mixture, compression ratio, injection timing, environmental conditions (e.g., atmospheric pressure, temperature, etc.), and so forth.

A dual-fuel engine is an alternative internal combustion engine designed to run on more than one fuel, for example, natural gas and diesel, each stored in separate vessels. Such engines are capable of burning varying proportions of the resulting blend of fuels in the combustion chamber and the fuel injection or spark timing may be adjusted according to the blend of fuels in the combustion chamber. For dual fuel operation where one of the fuel is premixed with air, a reduction in nitrogen oxide (NOx) and particulate matter (PM) emissions is enabled by combusting a relatively larger fraction of the premixed fuel. However, one challenge is that some of the air-fuel mixture is trapped at the crevices proximate to an edge of the piston, resulting in efficiency loss and increased hydrocarbon and carbon monoxide emissions. In certain cases, the exhaust emissions may be subjected to after treatment, but the energy associated with the exhaust emissions is not used to generate useful work.

There is a need for an improved system and method for engines operating on more than one fuel.

BRIEF DESCRIPTION

In accordance with one embodiment of the present invention, at least one donor cylinder is coupled to an intake manifold. The intake manifold is configured to feed a mixture of air and a first fuel, or a mixture of air, the first fuel, and a second fuel to the at least one donor cylinder. At least one non-donor cylinder is coupled to the intake manifold and an exhaust manifold. The intake manifold is further configured to feed air, or a mixture of air and the second fuel to the at least one non-donor cylinder. An exhaust channel extend from the at least one donor cylinder to the intake manifold for recirculating an exhaust emission from the at least one donor cylinder to the at least one donor, and non-donor cylinders via the intake manifold.

In accordance with one embodiment of the present invention, a method includes combusting a mixture of air, a first fuel, and a second fuel in at least one donor cylinder. The method further includes combusting a mixture of air and the second fuel in at least one non-donor cylinder. The method also includes recirculating an exhaust emission from the at least one donor cylinder to the at least one non-donor cylinder and the donor cylinder.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In accordance with the embodiments of the present invention, an engine utilizing a plurality of fuels is disclosed. The exemplary engine includes an intake manifold, an exhaust manifold, at least one donor cylinder, and at least one non-donor cylinder. The at least one donor cylinder is coupled to the intake manifold. The intake manifold is configured to feed a mixture of air and a first fuel, or a mixture of air, the first fuel; and a second fuel to the at least one donor cylinder. The at least one non-donor cylinder is coupled to the intake manifold and the exhaust manifold. The intake manifold is further configured to feed air, or a mixture of air and the second fuel to the at least one non-donor cylinder. An exhaust channel extends from the at least one donor cylinder to the intake manifold and is used for recirculating an exhaust emission from the at least one donor cylinder to the at least one donor, and non-donor cylinders via the intake manifold. In accordance with certain embodiments of the invention, a method associated with the exemplary engine is disclosed. The embodiments of the present invention enables operating the engine in a dual fuel mode while simultaneously controlling emissions such as nitrogen oxides ($NO_x$), particulate matter (PM), carbon monoxide (CO), and unburnt hydrocarbons (HC). Furthermore, efficiency of the engine may be enhanced by capturing the energy from unburnt fuel in the non-donor cylinders.

Figure 1:
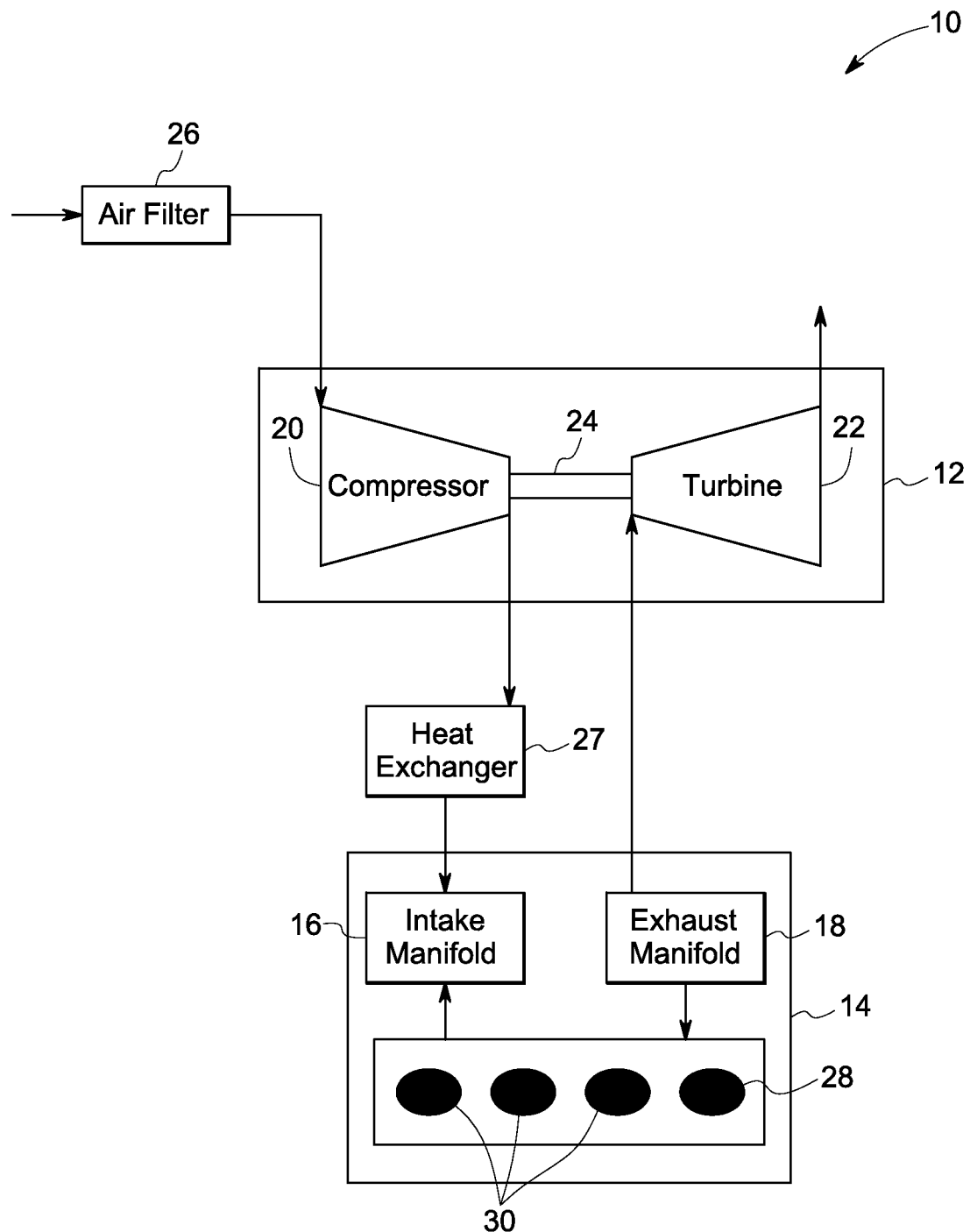
FIG. 1 is a diagrammatical representation of a turbocharged power unit having an engine operating on dual fuels in accordance with an exemplary embodiment of the present invention.

Referring to FIG. 1, a turbocharged power unit 10 is illustrated in accordance with certain embodiments of the present invention. The power unit 10 includes a turbo-charger 12 and an engine 14. In accordance with the embodiments of the present invention, the engine 14 is a dual fuel engine. A motor-generator unit (not shown) may be mechanically coupled to the turbocharger 12. As discussed in further detail below, embodiments of the present invention provide emission control features for the engine 14. It should be noted herein that although the turbocharged power unit 10 is disclosed, the engine 14 is also applicable for other applications requiring engine power. Similarly, aspects of the invention are suitable for any engine requiring control of exhaust emissions.

The illustrated engine 14 includes an air intake manifold 16 and an exhaust manifold 18. The turbo-charger 12 includes a compressor 20 and a turbine 22 and is operated to supply compressed air to the intake manifold 16 for combustion within the engine 14. The turbine 22 is coupled to the exhaust manifold 18 for extracting energy from exhaust gases for rotating a turbocharger shaft 24 coupled to the compressor 20. The compressor 20 draws ambient air through a filter 26 and provides compressed air to a heat exchanger 27. The temperature of air is increased due to compression. The compressed air flows through the heat exchanger 27 such that the temperature of air is reduced prior to delivery into the intake manifold 16 of the engine 14. In one embodiment, the heat exchanger 27 is an air-to-water heat exchanger, which utilizes a coolant to facilitate removal of heat from the compressed air. In another embodiment, the heat exchanger is an air-to-air heat exchanger, which utilize ambient air to facilitate removal of heat from compressed air.

In the illustrated embodiment, the engine 14 includes a donor cylinder 28 and three non-donor cylinders 30. It should be noted herein that the number of donor cylinders 28 and non-donor cylinders 30 may vary depending on the application. A piston (not shown) is slidably disposed in each cylinder and reciprocates between a top dead center and a bottom dead center position. The engine 14 and associated emission control features are discussed in greater detail with reference to subsequent figures below.

Figure 2:
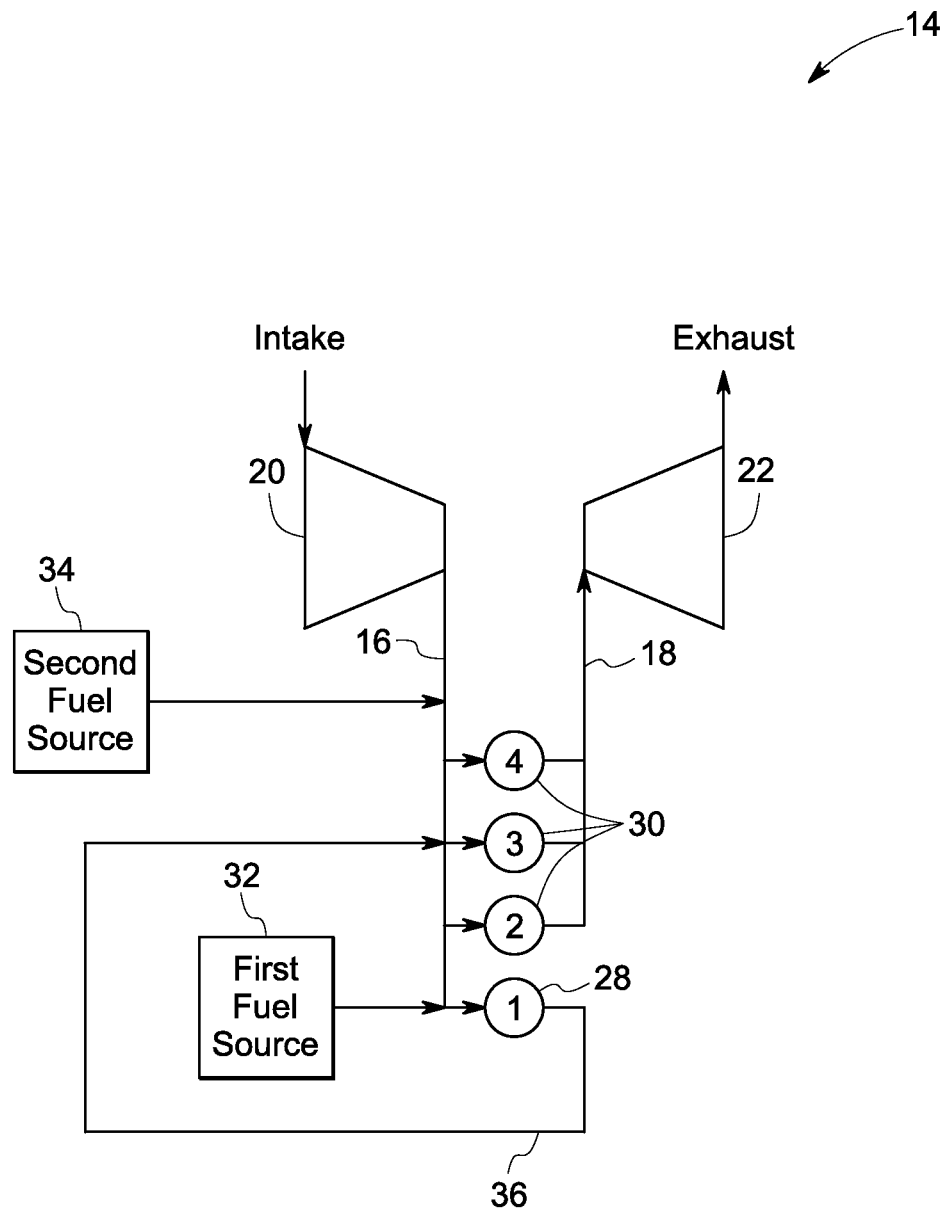
FIG. 2 is a diagrammatical representation of the exemplary engine having emission control features in accordance with an embodiment of FIG. 1.

Referring to FIG. 2, the engine 14 is illustrated in accordance with the embodiment of FIG. 1. The illustrated engine 14 includes the air intake manifold 16 and the exhaust manifold 18, one donor cylinder 28 and three non-donor cylinders 30. As discussed previously, the number of donor cylinders 28 and non-donor cylinders 30 may vary depending on the application. The donor cylinder 28 is coupled to the intake manifold 16. The non-donor cylinders 30 are coupled to both the intake manifold 16 and the exhaust manifold 18.

As discussed above, the engine 14 utilizes a plurality of fuels for operating the engine 14. A first fuel source 32 is coupled to the intake manifold 16 for feeding a first fuel, for example a gaseous fuel, via the intake manifold 16 to the donor cylinder 28. The gaseous fuel may include but not limited to natural gas, nitrogen, hydrogen, syngas, gasoline, ethanol, carbon monoxide, and propane. In some embodiments, a plurality of gaseous fuels may be fed via the intake manifold 16 to the donor cylinder 28. A second fuel source 34 is coupled to the intake manifold 16, for feeding a second fuel, for example diesel, via the intake manifold 16 to the donor cylinder 28 and the non-donor cylinders 30. The second fuel may also include other type of fuels. In some embodiments, the second fuel source 34 is configured in such a way so as to directly inject the second fuel to the donor cylinder 28 and the non-donor cylinders 30 instead of routing through the intake manifold 16.

In one embodiment, a mixture of air and the first fuel are fed via the intake manifold 16 to the donor cylinder 28, and the second fuel is injected directly into the donor cylinder 28. In another embodiment, a mixture of air, the first fuel, and the second fuel are fed via the intake manifold 16 to the donor cylinder 28. The air, the first fuel, and the second fuel are combusted within the donor cylinder 28. In one embodiment, air is fed via the intake manifold 16 to the non-donor cylinders 30, and the second fuel is injected directly into the non-donor cylinders 30. In another embodiment, a mixture of air and the second fuel is injected via the intake manifold 16 into the non-donor cylinders 30. All such permutations and combinations of feeding the air, the first fuel, and the second fuel to the donor and non-donor cylinders 28, 30 are envisaged. The air and the second fuel are combusted within the non-donor cylinders 30.

As discussed above, one advantage of using dual fuels instead of a single fuel is that dual fuels, when subjected to combustion, can generate less emissions such as nitrogen oxide ($NO_x$), and particulate matter, when one of the fuels is premixed with the air prior to combustion. One of the drawbacks associated with the use of dual fuels for combustion is the increased generation of unburnt hydrocarbons and carbon monoxide. Some of the air-fuel mixture is trapped at the crevices proximate to an edge of the piston resulting in efficiency loss and increased emissions of partially burnt and unburnt fuel.

In accordance with the embodiments of the present invention, the air, the first fuel, and the second fuel are combusted within the donor cylinder 28, and the air, the second fuel are combusted within the non-donor cylinders 30. One portion of an exhaust emission from the donor cylinder 28 is recirculated via an exhaust channel 36, the intake manifold 16, to the non-donor cylinders 30 and further combusted along with the air and the second fuel. The other portion of the exhaust emission from the donor cylinder 28 is recirculated via the exhaust channel 36, the intake manifold 16, to the donor cylinder 28 and further combusted along with the air, the first fuel and the second fuel. The exhaust emission from the non-donor cylinders 30 are fed via the exhaust manifold 18 to the turbine 22.

In accordance with the embodiments of the present invention, the donor cylinder 28 is operated using dual fuels and non-donor cylinders 30 are operated using single fuel. The combustion of dual fuels within the donor cylinder 28 generates lower $NO_x$ and particulate matter but relatively higher amounts of hydrocarbons and carbon monoxide. The hydrocarbon and the carbon monoxide emissions are recirculated again to the donor and non-donor cylinders 28, 30 and combusted again so as to oxidize the hydrocarbon and the carbon monoxide emissions. The overall fuel utilization is enhanced and emissions are substantially reduced. The efficiency of the engine 14 is enhanced since energy from the unburnt hydrocarbon and carbon monoxide emissions is extracted in the non-donor cylinders 30.

Figure 3:
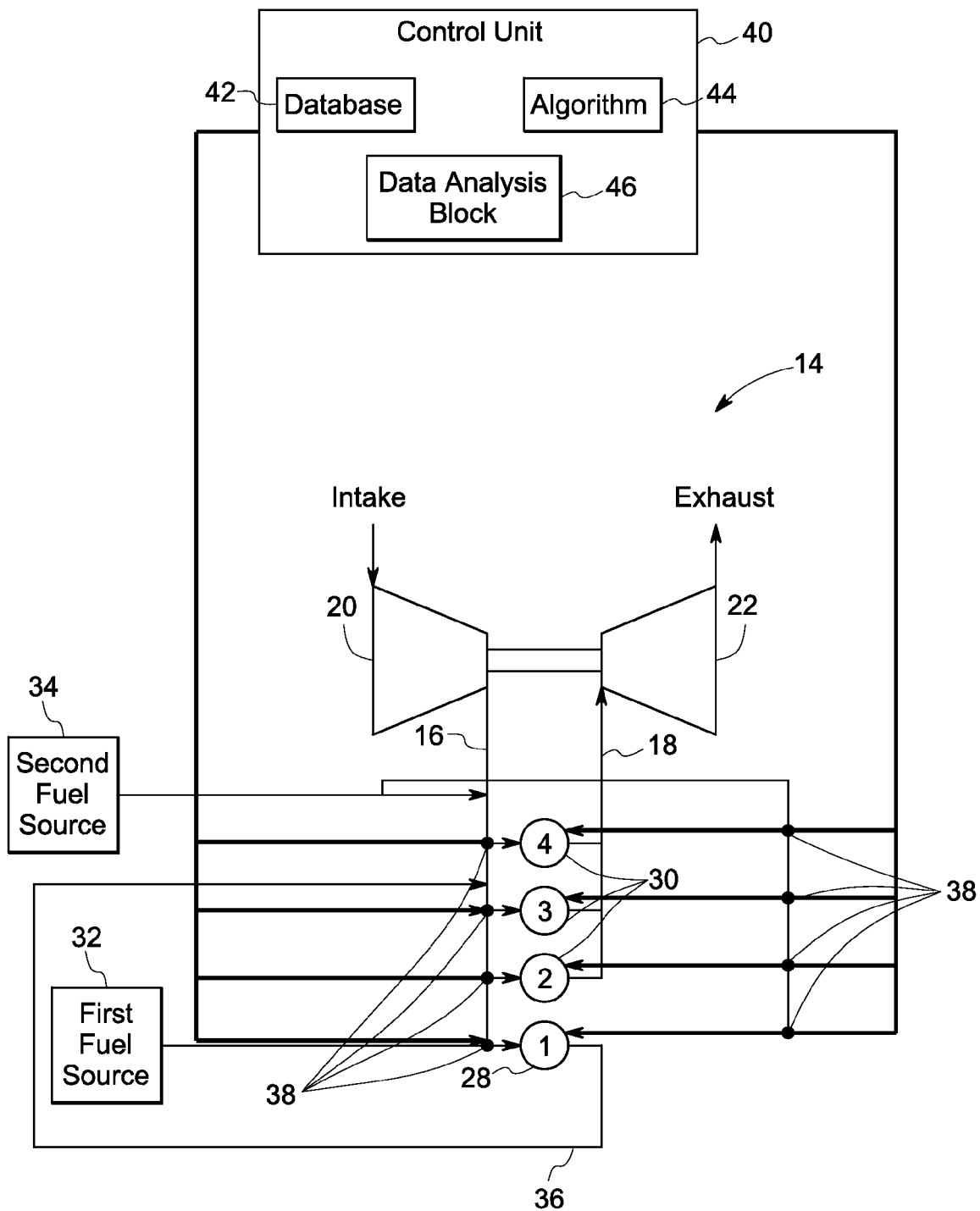
FIG. 3 is a diagrammatical representation of the exemplary engine having emission control features in accordance with an embodiment of FIG. 2.

Referring to FIG. 3, the engine 14 is illustrated in accordance with the embodiment of FIG. 2. In the illustrated embodiment, the power unit 10 also includes a control unit 40. In one embodiment, the control unit 40 is an electronic fuel injection control unit for the engine 14. In another embodiment, the control unit 40 is an electronic logic controller that is programmable by a user. The control unit 40 may be operable to control operation of a plurality of fuel injectors 38 for injecting the first and second fuel into the donor and non-donor cylinders 28, 30 of the engine 14 so as to optimize the mode of combustion. In some embodiments, the control unit 40 may control the plurality of fuel injectors 38 based on an output from a plurality of sensors (not shown). The plurality of sensors may include but not limited to an emission sensor, fuel injection timing sensor, a throttle position sensor, manifold air pressure sensor, manifold air temperature sensor, exhaust gas temperature sensor, turbocharger speed sensor, engine power sensor, or the like.

In some embodiments, the control unit 40 may further include a database 42, an algorithm 44, and a data analysis block 46. The database 42 may be configured to store predefined information about the engine 14. For example, the database 42 may store information relating to engine emissions, temperature, and pressure of the engine 14, fuel injection timing, turbocharger speed, power output of the engine 14, or the like. Furthermore, the database 42 may be configured to store actual sensed/detected information from the above-mentioned sensors. The algorithm 44 facilitates the processing of signals from the above-mentioned plurality of sensors.

The data analysis block 46 may include a range of circuitry types, such as a microprocessor, a programmable logic controller, a logic module, etc. The data analysis block 46 in combination with the algorithm 44 may be used to perform the various computational operations relating to optimizing the combustion mode within the donor and non-donor cylinders 28, 30 of the engine 14. In certain embodiments, the control unit 40 may output data to a user interface 48. Advantageously, the user interface facilitates inputs from a user to the control unit 40 and provides a mechanism through which a user can manipulate data and sensed properties from the control unit 40. As will be appreciated by those skilled in the art, the user interface 48 may include a command line interface, menu driven interface, and graphical user interface. The control unit 40 is operable to adjust engine characteristics affecting the emissions from the engine 14.

As discussed herein, the control unit 40 controls the fuel injectors 38 in such a way so as to control the injection of first and second fuels into the donor and non-donor cylinders 28, 30. In one embodiment, the second fuel is premixed with air and injected into the non-donor cylinders 30. In another embodiment, the second fuel is injected directly into the non-donor cylinders 30. In a specific embodiment, the second fuel is premixed with air and the first fuel and then injected into the donor cylinder 28. In another specific embodiment, the second fuel is injected directly into the donor cylinder 28.

It is known to utilize premixed combustion engines to reduce exhaust emissions. However, the premixed combustion may result in potential misfire and generation of hydrocarbons and carbon monoxide. In accordance with one embodiment of the present invention, the donor cylinder 28 is operated in a premixed combustion mode and the non-donor cylinders 30 are operated in a diffusion combustion mode. In such embodiments, the exhaust emissions from the donor cylinder 28 is again recirculated to the donor and non-donor cylinders 28, 30, further combusted so as to oxidize the hydrocarbons and carbon monoxide in the exhaust emissions.

In another embodiment, the donor cylinder 28 is operated in a diffusion combustion mode and the non-donor cylinders 30 are operated in a premixed combustion mode. In yet another embodiment, the donor cylinder 28 and the non-donor cylinders 30 are operated in a premixed combustion mode. In yet another embodiment, the donor cylinder 28 and the non-donor cylinders 30 are operated in a diffusion combustion mode. All such permutations and combinations are envisaged. A premixed combustion is a combustion mode in which the oxidizer is mixed with the fuel before fuel reaches a flame front in a combustion chamber. This premixing may occur in the donor and non-donor cylinders 28, 30, or in the intake manifold 16. In the diffusion combustion mode, the oxidizer combines with the fuel by diffusion in a combustion chamber in the donor and non-donor cylinders 28, 30 during the combustion event.

In another embodiment of the invention, the donor cylinder 28 operates at substantially lean combustion mode and the non-donor cylinders 30 operate at substantially stoichiometric combustion mode. Lean combustion refers to the use of lean air-fuel mixtures in the combustion chamber of the donor and non-donor cylinders 28, 30. In such a combustion mode, quantity of air is substantially higher than a quantity required to oxidize all of the fuel. In a stoichiometric combustion mode, the quantity of air mixed with the fuel is a quantity required to completely oxidize all of the fuel, with little or no excess air present. Furthermore, an after-treatment device (not shown) such as a three-way catalyst may be located downstream of the non-donor cylinders 30 to control emissions. Aftertreatment devices such as a diesel oxidation catalyst or a urea-selective catalytic reduction catalyst may be located downstream of the donor cylinder 28.

In another embodiment of the invention, the non-donor cylinder 30 operates at substantially lean combustion mode and the donor cylinders 28 operate at substantially stoichiometric combustion mode. Furthermore, an after-treatment device (not shown) such as a three-way catalyst may be located downstream of the donor cylinders 28 to control emissions. Aftertreatment devices such as a diesel oxidation catalyst or urea-selective catalytic reduction catalyst may be located downstream of the non-donor cylinders 30.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   combusting a mixture of air, a first fuel, and a second fuel in at least one donor cylinder;
   combusting a mixture of air and the second fuel in at least one non-donor cylinder, wherein the at least one donor cylinder and the at least one non-donor cylinder are coupled to an intake manifold; and
   recirculating an exhaust emission from the at least one donor cylinder to the non-donor cylinder and the donor cylinder via the intake manifold.

2. The method of claim 1, further comprising:
   combusting one portion of the exhaust emission along with the mixture of air, the first fuel, and the second fuel, in the at least one donor cylinder to oxidize hydrocarbons and carbon monoxide in the one portion of the exhaust emission; and
   combusting another portion of the exhaust emission along with the mixture of air and the second fuel, in the at least one non-donor cylinder to oxidize hydrocarbons and carbon monoxide in the other portion of the exhaust emission.

3. The method of claim 1, further comprising feeding the mixture of air and the first fuel to the at least one donor cylinder via the intake manifold, and feeding the second fuel directly to the at least one donor cylinder.

4. The method of claim 1, further comprising feeding the mixture of air, the first fuel, and the second fuel to the at least one donor cylinder via the intake manifold.

5. The method of claim 1, further comprising feeding air to the at least one non-donor cylinder via the intake manifold, and feeding the second fuel directly to the at least one non-donor cylinder.

6. The method of claim 1, further comprising feeding the mixture of air and the second fuel to the at least one non-donor cylinder via the intake manifold.

7. The method claim 1, further comprising operating the at least one donor cylinder in a premixed combustion mode.

8. The method of claim 1, further comprising operating the at least one donor cylinder in a diffusion combustion mode.

9. The method of claim 1, further comprising operating the at least one non-donor cylinder in a premixed combustion mode.

10. The method of claim 1, further comprising operating the at least one non-donor cylinder in a diffusion combustion mode.

\* \* \* \* \*